3,282,959
7-CHLORO-α-METHYLTRYPTAMINE DERIVATIVES

John Robert Vane, Radlett, and Henry Oswald Jackson Collier, London, England, assignors to Parke, Davis & Company, Detroit, Mich., a company of Michigan
No Drawing. Filed Mar. 21, 1962, Ser. No. 181,480
Claims priority, application Great Britain, Apr. 6, 1961, 12,478/61
3 Claims. (Cl. 260—326.15)

This invention relates to tryptamine compounds which in free base form have the formula

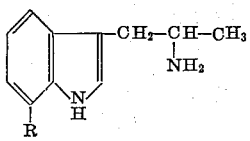

where R represents methyl, methoxy or chloro, as well as acid addition salts thereof; and to processes for production of the same.

The products of the invention from addition salts with organic and inorganic acids. Such salts are preferred for those cases where water-solubility is a desired property. Among the many organic and inorganic acid addition salts contemplated by the invention are the hydrochloric, hydrobromic, p-toluenesulfonic, sulfamic, sulfuric, phosphoric, acetic, citric and tartaric acid addition salts. The products of the invention possess a stimulant action on the central nervous system of living mammals and are therefore useful as analeptic agents, e.g. as psychic energizers for combatting depressive states, or as anoretic agents for alleviation of obesity in living mammals. Additionally, the products, both final and intermediate products, are also useful as starting materials for the production of other products having similar and other uses.

In accordance with one embodiment, the process of the invention is characterized in that a 7-methyl- or 7-methoxy-3-(2-methyl-2-nitrovinyl) idole of formula,

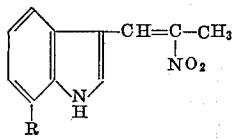

is subjected to reduction by reaction in the presence of an anhydrous non-hydroxylic organic solvent with lithium aluminum hydride or with a complex oxidizable metal borohydride, such as sodium, potassium or lithium borohydride, in the presence of aluminum chloride and by decomposition of the resulting reaction complex with water or an aqueous medium.

The reaction proceeds without application of external heating and following addition of the reducing agent, it is preferred to maintain the reaction mixture at elevated temperature, more preferably at the reflux temperature of the reaction mixture, to accomplish prompt completion of the reaction. As solvents for the reaction, anhydrous non-hydroxylic organic solvents such as dioxane, diethyleneglycol dimethyl ether and tetrahydrofuran are employed. After completion of the reaction, the reaction product is subjected to decomposition by treatment with water or other aqueous medium. Decomposition is ordinarily carried out at room temperature; and since the reaction is exothermic, external cooling may be applied.

According to another embodiment, the process of the invention is characterized in that a 3-(β-nitro-α-propenyl)-indole of formula

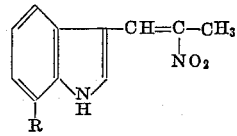

where R has the above significance, is subjected to treatment with iron and acetic acid in the presence of water and an inert water-miscible organic solvent, and the resulting indolyl acetone compound of formula

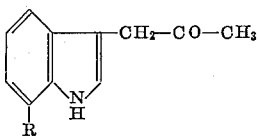

where R has the above significance, is subjected to reductive amination by means of catalytic hydrogenation in the presence of aqueous ammonia. For the preparation of the indolyl acetone compound at least two equivalents and preferably an excess of iron, as a powder, are employed for each equivalent of the 3-(β-nitro-α-propenyl)-indole. Acetic acid of sufficient strength and concentration in the reaction mixture is employed to maintain the latter strongly acidic throughout the reaction. An inert water-miscible organic solvent such as ethanol, isopropanol, dioxane or tetrahydrofuran is employed. The reaction temperature can be varied considerably, preferably in the range from about 50° to 100° C. and for best results at the reflux temperature of the reaction mixture. The reaction is carried out under conditions such that excess 3-(β-nitro-α-propenyl)-indole in the reducing mixture is kept to a minimum. Preferably for this purpose, the reaction is carried out with a reflux apparatus of the Soxhlet type in which the indole starting material is placed in the Soxhlet thimble located in a side arm below the condenser so that the starting material is slowly leached into the reaction flask by condensate and vapor, refluxing being continued at least until the indole compound is completely taken up in the reaction mixture. The reductive amination step is carried out by means which per se are conventional, using hydrogen gas and ammonia under elevated pressure and temperature in the presence of a metal hydrogenation catalyst such as Raney nickel. The pressure and temperature for the reaction are subject to wide variation. In general, hydrogen pressures of at least about 50 atmospheres, preferably 75 to 100 atmospheres, and temperatures from about 50 to 100° C. or higher, preferably 60 to 75° C., are employed. The reaction is favored by the use of an inert water-miscible solvent such as ethanol, n-propanol, isopropanol, dioxane or tetrahydrofuran.

In accordance with a still further embodiment, the process of the invention is characterized in that a 3-hydroxy-3-substituted-oxindole compound of formula

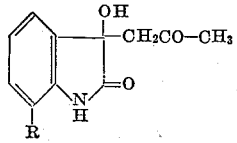

where R has the above significance is reacted with hydroxylamine and the resulting 3-hydroxy-3-2′-oximinopropyloxindole of formula

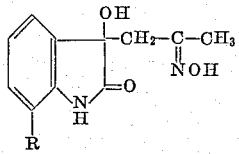

Where R has the above significance, is subjected to reduction by reaction in the presence of an anhydrous non-hydroxylic organic solvent with lithium aluminum hydride or with a complex oxidizable metal borohydride in the presence of aluminum chloride and decomposition of the resulting reaction complex with water or an aqueous medium. The reaction with hydroxylamine may be carried out over a wide range of temperature conveniently from room temperature to about 150° C. and preferably at the reflux temperature of the reaction mixture. The hydroxylamine is preferably supplied in the form of an acid addition salt such as the hydrochloride salt, and the reaction mixture is maintained at neutrality by addition of a basic agent such as sodium hydroxide, sodium acetate or pyridine. To facilitate the reaction in which the hydroxylamine is supplied in water-soluble salt form, the reaction is carried out in an inert water-miscible solvent such as ethanol or isopropanol. For the reduction step, one may employ lithium aluminum hydride, or alternatively, a complex oxidizable metal borohydride, (e.g., sodium, potassium or lithium borohydride) in the presence of aluminum chloride, as indicated. The reaction proceeds without application of external heat and following addition of the reducing agent it is preferred to maintain the reaction mixture at elevated temperature, more preferably at the reflux temperature of the reaction mixture, to accomplish prompt completion of the reaction. As solvents for the reaction, anhydrous non-hydroxylic organic solvents such as dioxane, diethyleneglycol dimethyl ether and tetrahydrofuran are employed. After completion of the reaction, the reaction product is subjected to decomposition by treatment with water or other aqueous medium. Decomposition is ordinarily carried out at room temperature and since the reaction is exothermic, external cooling may be applied.

The products of the process can be isolated in free base form or in the form of an acid addition salt. Thus, where an acid is present in the reaction mixture, the product is obtained in addition salt form with the acid and can be converted to the free base by neutralization with a basic agent. Other acid addition salts can be obtained by reaction of the free base with any desired acid, either organic or inorganic, and isolation thereof is facilitated by formation of the acid salt in a medium in which the salt is insoluble, thereby permitting recovery of the salt as an insoluble precipitate.

The invention is illustrated by the following examples:

*Example 1*

7-methoxy-3-(2-methyl-2-nitrovinyl)indole (5.0 g.) in dry tetrahydrofuran (100 ml.) is added to a suspension of lithium aluminum hydride (5.0 g.) in dry ether (50 ml.) and dry tetrahydrofuran (80 ml.). The mixture is refluxed for four hours, cooled, cautiously treated with water (10 ml.), refluxed for 10 minutes, then filtered. The filtrate is evaporated to dryness, the residue dissolved in dry ether and an ethereal solution of excess hydrogen chloride added to the solution. The product, 7-methoxy-α-methyl tryptamine hydrochloride, separates in crystalline form and is collected and dried; M.P. 247–248° C., after recrystallization from methanol-ethyl acetate mixture.

The indole starting material is prepared by the following procedure: 7-methoxy-3-indolealdehyde (5.4 g.) is added to nitroethane (35 ml.) containing ammonium acetate (1.7 g.) and the mixture is refluxed for two hours. 7-methoxy-3-(2-methyl - 2 - nitrovinyl)indole separates on cooling and is collected by filtration; M.P. 161–163° C.

*Example 2*

A suspension of lithium aluminum hydride (17.7 g.) in dry ether (1770 ml.) is refluxed for eight hours through a Soxhlet apparatus containing 17.7 g. of 7-chloro-3-(2-methyl-2-nitrovinyl)indole in the Soxhlet chamber, 5 hours being required for complete extraction of the indole from the chamber. The reaction mixture is cooled, cautiously treated with sufficient water to decompose the reaction product and the aqueous mixture is then refluxed for 10 minutes and filtered. The filtrate is evaporated to dryness, the residue taken up in dry ether and an ethereal solution of excess hydrogen chloride added to the solution. The desired product, 7-chloro-α-methyltryptamine hydrochloride, separates in crystalline form and is collected by filtration and dried; M.P. 256–260° C. after recrystallization from methanol-ethyl acetate mixture.

The indole starting material is prepared by the following procedure: A solution of 7-chloroindole (15 g.) in dimethylformamide (8.5 ml.) is added to a stirred solution of phosphorous oxychloride (10 ml.) in dimethylformamide (33 ml.) at 20–30° C. Following addition, the mixture is stirred at 35–40° C. for 45 minutes, cooled and then treated with crushed ice (250 g.). Sodium hydroxide (19 g.) in water (100 ml.) is added at such a rate that during three-quarters of the addition the mixture remains acid. The last portion is added rapidly and the resulting mixture boiled for one minute. 7-chloroindole-3-aldehyde separates on cooling and is collected and recrystallized from methanol; M.P. 183–185° C. The aldehyde (in the amount of 5 g.) is added to nitroethane (20 ml.) containing ammonium acetate (1 g.) and the mixture is refluxed for two hours. 7-chloro-3-(2-methyl-2-nitrovinyl)indole separates on cooling and is collected by filtration; M.P. 181–182° C.

*Example 3*

7 - methyl-3-(2-methyl-2-nitrovinyl)indole (4.7 g.) in dry tetrahydrofuran (100 ml.) is added to a suspension of lithium aluminum hydride (5.0 g.) in dry ether (50 ml.) and dry tetrahydrofuran (80 ml.). The mixture is heated at reflux temperature for four hours, cooled and cautiously treated with water (10 ml.). The mixture is then refluxed for 10 minutes, filtered and the filtrate is distilled under vacuum and the desired product, 7-methyl-α-methyl-tryptamine, collected as the fraction boiling at 156–158° C./0.2 mm.; M.P. 106–107° C. after recrystallization from ether.

The indole starting material is prepared in accordance with the procedure set forth above in Example 2 for the preparation of 7-chloro-3-(2-methyl-2-nitrovinyl)indole starting with 7-methylindole (48.7 g.) by way of the intermediate 7 - methylindole - 3 - aldehyde (used in the amount of 22.6 g.) and employing equivalent amounts of the respective solvents, reactants, etc.

*Example 4*

A mixture of reduced iron powder (20 g.), water (50 ml.), alcohol (50 ml.) and glacial acetic acid (4 ml.) is placed in a flask fitted with a side-arm condenser and a Soxhlet thimble containing 11.5 g. of 7-methoxy-3-(2-methyl-2-nitrovinyl)indole. The mixture is stirred well and heated to reflux. Refluxing is continued until the leaching action of the condensed vapor accomplishes the transfer of the starting material in the thimble into the flask. The reaction mixture is then made alkaline by addition of dilute aqueous sodium hydroxide solution and the alkaline mixture is filtered. The iron precipitate (filter cake) is washed by boiling and stirring with 95% alcohol and the combined filtrate and washings are concentrated to a small volume by evaporation in vacuo. 7-methoxy-3-indolyl acetone, which separates on standing, is collected by filtration and crystallized from ether.

The product, in the amount of 10.1 g., is mixed with concentrated ammonium hydroxide (10 ml.; density, 0.88) and Raney nickel hydrogenation catalyst (2 g.) in an autoclave and the volume is adjusted to 50 ml. with ethanol. The mixture is heated to 75–85° C. under hydrogen pressure of about 100 atmospheres and the autoclave is then rotated for 24 hours whereupon it is cooled, vented and the catalyst removed by filtration. The filtrate is concentrated by evaporation in vacuo to remove the solvent, the residual crude free base product is taken up in ether and the resulting solution acidified by addition of excess hydrogen chloride in ether. The desired product in crystalline form, 7-methoxy-α-methyltryptamine hydrochloride, is recovered by filtration of the ethereal mixture; M.P. 247–248° C. after recrystallization from methanol-ethyl acetate.

*Example 5*

Using the procedure described in Example 4, 7-methyl-3-(2-methyl-2-nitrovinyl)indole (11 g.) is placed in a Soxhlet thimble and slowly eluted by condensed vapor into a refluxing mixture of alcohol (50 ml.), water (50 ml.), glacial acetic acid (4 ml.) and reduced iron powder (20 g.). When the elution is complete, the mixture is cooled, neutralized with dilute aqueous sodium bicarbonate solution, and 50 ml. of ethanol is added. The mixture is heated to boiling and immediately filtered. The filter cake is extracted with boiling ethanol and the combined filtrate and extracts are concentrated by evaporation in vacuo to remove the ethanol present. The residual product 7-methyl-3-indolyl acetone, separates and is collected. The product, in the amount of 9.3 g., is mixed with concentrated ammonium hydroxide (10 ml.; 0.88 density) and Raney nickel hydrogenation catalyst in an autoclave and the volume adjusted to 50 ml. with ethanol. The mixture is heated to 75° C. under hydrogen pressure of 100 atmospheres and the autoclave is then rotated for twenty-four hours, cooled, vented and the catalyst removed by filtration. The filtrate is distilled under vacuum and the product, 7-methyl-α-methyltryptamine, collected as the fraction boiling at 156–158° C./0.2 mm.; M.P. 106–107° C. after recrystallization from ether.

*Example 6*

3-acetonyl-3-hydroxy-7-methoxyoxindole (6.7 g.) is dissolved in hot ethanol (50 ml., 96%) and hydroxylamine hydrochloride (3.5 g.) in water (10 ml.) is added. The resulting solution is neutralized with 2 N aqueous sodium hydroxide (0.033 mol.) using bromophenol blue as an external indicator. Alcohol (30 ml.) is removed from the neutral mixture under reduced pressure and the residual mixture is diluted with water and cooled. The product, 3 - acetonyl-3-hydroxy-7-methoxyoxindoleoxime, separates on standing and is collected. A slurry of the product (in the amount of 3.1 g.) in tetrahydrofuran (50 ml.) is added dropwise to a stirred suspension of lithium aluminum hydride (3.0 g.) in tetrahydrofuran (50 ml.). On completion of the addition, the mixture is heated under reflux for four hours, cooled and decomposed by the gradual addition of a minimum amount of water. The resulting suspension is filtered and the filtrate is dried over anhydrous sodium sulfate and subjected to vacuum distillation to remove solvent. The residue is taken up in ether and an excess of a saturated solution of hydrogen chloride in ether is added. The crystalline product which separates, 7-methoxy-α-methyltryptamine hydrochloride, is isolated by filtration and recrystallized from methanol-ethyl acetate, M.P. 247–248° C.

The starting material, 3-acetonyl-3-hydroxy-7-methoxyoxindole, is prepared from 7-methoxyisatin (22 g.), acetone (150 ml.) and diethylamine (4 ml.) by the corresponding procedure for the preparation of the corresponding 7-methyloxindole set forth below under Example 7.

*Example 7*

3-acetonyl-3-hydroxy - 7 - methyloxindole (14.04 g.; 0.064 mol.) is dissolved in hot ethanol (200 ml., 96%) and hydroxylamine hydrochloride (7.0 g.; 0.1 mol.) in water (15 ml.) is added. The resulting solution is neutralized with 2 N aqueous sodium hydroxide solution (about 0.03 mol. required) using bromophenol blue indicator. Removal of about 30 ml. of alcohol under reduced pressure, dilution with water and cooling cause separation of the product, 3-acetonyl-3-hydroxy-7-methyloxindoleoxime, which is collected and dried; M.P. 200–201° C. (decomp.). The product (in the amount of 11.9 g.) in tetrahydrofuran (50 ml.) is added dropwise as a slurry to a stirred suspension of lithium aluminum hydride (10 g.) in tetrahydrofuran (50 ml.). On completion of the addition, the mixture is heated under reflux for four hours. The reaction mixture after cooling is decomposed by the gradual addition of a minimum amount of water, the aqueous mixture is filtered, the filtrate dried and subjected to distillation in vacuo and the desired product 7-methyl-α-methyltryptamine, collected as the fraction boiling at 156–158° C. at 0.2 mm.; M.P. 106–107° C. after recrystallization from ether.

The starting material, 3-acetonyl-3-hydroxy-7-methyloxindole, is prepared from 7-methyl isatin, as follows: 7-methyl isatin (20 g.) is suspended in acetone (150 ml.) and diethylamine (4 ml.) is added. The mixture is allowed to stand at room temperature first for three hours with occasional stirring and then overnight. The product which separates, 3-acetonyl-3-hydroxy-7-methyloxindole, is collected by filtration and washed successively with acetone; evaporation of the mother liquors and the washings yields further amounts of the product. After recrystallization from acetone, the product melts at 201–202° C. (decomp.).

*Example 8*

3-acetonyl-3-hydroxy-7-chloro-oxindole (5.6 g., prepared from 7-chloro isatin, acetone and diethylamine by the procedure described in Example 7 for the preparation of the corresponding 7-methyloxindole) is dissolved in hot ethanol (50 ml.) and hydroxylamine hydrochloride is added. The resulting solution is neutralized with 2 N aqueous sodium hydroxide solution using bromophenol blue as an external indicator. The neutral mixture is evaporated in vacuo to remove about 30 ml. of ethanol, and the concentrated mixture is diluted with water and cooled. The product which separates, 3-acetonyl-3-hydroxy-7-chlorooxindoleoxime, is collected and dried. The product, in the amount of 4.0 g., is mixed with tetrahydrofuran (50 ml.) and the mixture added dropwise to a stirred suspension of lithium aluminum hydride (4.0 g.) in tetrahydrofuran (50 ml.). When the addition is completed, the mixture is heated under reflux for four hours, cooled and decomposed by gradual addition of a minimum amount of water. The aqueous mixture is filtered, concentrated to a syrup by evaporation in vacuo and the residue is taken up in ether. The ethereal solution is treated with an excess of saturated hydrogen chloride in ether and the product which precipitates, 7-chloro-α-methyltryptamine hydrochloride, is collected and recrystallized from methanol-ethyl acetate; M.P. 256–260° C.

The hydrobromide, sulfate, sulfamate and p-toluenesulfonate salts can be prepared by treatment of an ether solution of the free base, 7-chloro-α-methyltryptamine, with at least one equivalent of the corresponding acid, the free base being obtained from the hydrochloride salt by neutralization of an aqueous solution of the latter, extraction of the neutral mixture with ether, washing and drying the combined extracts and removing the solvent therefrom. By the same specific procedure, salts with these acids can be prepared from the related product, 7-methoxy-α-methyl tryptamine hydrochloride. As an illustration of the preparation of still another salt of another free base product, 7-methyl-α-methyltryptamine, a solution of the free base in isopropanol is mixed with a solution of one equivalent of citric acid in isopropanol and the solvent is removed under reduced pressure leaving the desired citric acid salt of 7-methyl-α-methyltryptamine.

What we claim is:

1. A compound selected from the class consisting of the free base 7-chloro-α-methyltryptamine and acid addition salts thereof.
2. An acid addition salt of 7-chloro-α-methyltryptamine.
3. 7-chloro-α-methyltryptamine hydrochloride.

References Cited by the Examiner

UNITED STATES PATENTS

| | | | |
|---|---|---|---|
| 2,920,080 | 1/1960 | Jolly et al. | 260—319 |
| 2,988,552 | 6/1961 | Jolly et al. | 260—319 |

FOREIGN PATENTS

| | | |
|---|---|---|
| 807,876 | 1/1959 | Great Britain. |
| 1,187,065 | 3/1959 | France. |
| 1,188,326 | 3/1959 | France. |
| 1,214,122 | 11/1959 | France. |

OTHER REFERENCES

Vane: British J. Pharmacology 14, pp. 87–105 (1959).
Velluz: Ann. Pharm. France, volume 17, pages 16–20 (1959).

ALEX MAZEL, *Primary Examiner.*

IRVING MARCUS, *Examiner.*

EGON E. BERG, MARY U. O'BRIEN,
*Assistant Examiners.*